(12) United States Patent
Mourad et al.

(10) Patent No.: US 9,462,208 B2
(45) Date of Patent: Oct. 4, 2016

(54) METHOD AND APPARATUS FOR TRANSMITTING/RECEIVING DATA STREAM IN BROADCAST SYSTEM

(75) Inventors: Alain Mourad, London (GB); Ismael Gutierrez, London (GB); Sung-Ryul Yun, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 638 days.

(21) Appl. No.: 13/324,330

(22) Filed: Dec. 13, 2011

(65) Prior Publication Data
US 2012/0147273 A1 Jun. 14, 2012

(30) Foreign Application Priority Data

Dec. 13, 2010 (GB) .................................. 1021115.9
Nov. 24, 2011 (KR) ........................ 10-2011-0123470

(51) Int. Cl.
| | |
|---|---|
| *H04W 72/00* | (2009.01) |
| *H04N 5/38* | (2006.01) |
| *H04N 5/455* | (2006.01) |
| *H04L 5/00* | (2006.01) |
| *H04N 21/2343* | (2011.01) |
| *H04N 21/2385* | (2011.01) |
| *H04L 27/26* | (2006.01) |

(52) U.S. Cl.
CPC .............. *H04N 5/38* (2013.01); *H04L 5/0044* (2013.01); *H04L 5/0053* (2013.01); *H04N 5/455* (2013.01); *H04N 21/2385* (2013.01); *H04N 21/234327* (2013.01); *H04W 72/005* (2013.01); *H04L 27/2601* (2013.01)

(58) Field of Classification Search
None
See application file for complete search history.

(56) References Cited

U.S. PATENT DOCUMENTS

| | | | |
|---|---|---|---|
| 2005/0141475 A1 | 6/2005 | Vijayan et al. | |
| 2005/0163066 A1* | 7/2005 | Gerakoulis | ................... 370/320 |
| 2007/0036067 A1* | 2/2007 | Zhang et al. | ................. 370/208 |
| 2009/0052387 A1* | 2/2009 | Lee et al. | ...................... 370/329 |
| 2009/0304023 A1 | 12/2009 | Stadelmeier et al. | |

(Continued)

FOREIGN PATENT DOCUMENTS

| | | |
|---|---|---|
| EP | 1 533 963 | 5/2005 |
| KR | 1020090044515 | 5/2009 |

(Continued)

OTHER PUBLICATIONS

British Search Report dated Apr. 7, 2011 issued in counterpart application No. GB1021115.9, 3 pages.

(Continued)

*Primary Examiner* — Adnan Baig
(74) *Attorney, Agent, or Firm* — The Farrell Law Firm, P.C.

(57) ABSTRACT

Methods and apparatus are provided for transmitting and receiving a data stream in a digital video broadcast system. The data stream is segmented into a plurality of segments of the data stream. A frame is generated. The frame includes a preamble section and a data section. The data section carries the data stream, and the preamble section carries signalling information. The frame is transmitted to a receiver. In generating the frame, the data section of the frame is segmented into a plurality of frequency zones, and at least one segment of the data stream is mapped to a frequency zone of the plurality of frequency zones. The signalling information includes first segmentation information of the data stream and second segmentation information of the plurality of frequency zones.

24 Claims, 16 Drawing Sheets

(56) References Cited

U.S. PATENT DOCUMENTS

| | | | |
|---|---|---|---|
| 2010/0034219 A1 | 2/2010 | Stadelmeier et al. | |
| 2010/0135316 A1 | 6/2010 | Atungsiri et al. | |
| 2010/0226426 A1* | 9/2010 | Tupala et al. | 375/240.01 |
| 2010/0246719 A1* | 9/2010 | Ko et al. | 375/303 |
| 2011/0292865 A1* | 12/2011 | Seo et al. | 370/315 |

FOREIGN PATENT DOCUMENTS

| | | | | |
|---|---|---|---|---|
| KR | WO 2009075532 A2 * | 6/2009 | | H04L 5/0053 |
| WO | WO 2005/022811 | 3/2005 | | |
| WO | WO 2009/055324 | 4/2009 | | |
| WO | WO 2009075532 A2 * | 6/2009 | | |

OTHER PUBLICATIONS

Erik Dahlman et al., 3G Evolution, "Downlink Transmission Scheme", XP-002637031, Jun. 1, 2008.
Chih-Wei Huang et al., "Layered Video Resource Allocation in Moible WIMAX using Opportunistic Multicasting", IEEE Communications Society, Apr. 5, 2009.
Digital Video Broadcasting (DVB); Frame Structure Channel Coding and Modulation for a Second Generation Digital Terrestrial Television Broadcasting System.
(DVB-T2), Draft ETSI EN 302 755 V1.2.1_0.11, Mar. 16, 2010.
DVB Organization: Meeting Minutes, DVB TM-H 37th Meeting, XP017832701, Dec. 8, 2010.

* cited by examiner

L1 - CONFIG

| Field | Size (bits) | |
|---|---|---|
| SUB_SLICES_PER_FRAME | 15 | |
| NUM_PLP | 8 | |
| NUM_PLP_IN_L1DYN | 8 | } 30 |
| NUM_AUX | 4 | |
| AUX_CONFIG_RFU | 8 | |
| For i=0..NUM-RF1 { | | |
|     RF_IDX | 3 | |
|     FREQUENCY | 32 | |
| } | | |
| IF S2=="xxx1 { | | |
|     FEF_TYPE | 4 | |
|     FEF_LENGTH | 22 | |
|     FEF_INTERVAL | 8 | |
| } | | |
| For i=0..NUM_PLP-1 { | | |
|     PLP_ID | 8 | |
|     PLP_TYPE | 3 | |
|     PLP_PAYLOAD_TYPE | 5 | |
|     FF_FLAG | 1 | |
|     FIRST_RF_IDX | 3 | |
|     PLP_GROUP_ID | 8 | |
|     PLP_COD | 3 | |
|     PLP_MOD | 3 | |
|     PLP_ROTATION | 1 | |
|     PLP_FEC_TYPE | 2 | |
|     PLP_NUM_BLOACKS_MAX | 10 | |
|     FRAME_INTERVAL | 8 | |
|     TIME_IL_LENGTH | 8 | |
|     TIMW_IL_TYPE | 1 | |
|     IN_BAND_FLAG | 1 | |
| } | | |
| For i=0..NUM_AUX-1 { | | |
|     AUX_RFU | 32 | |
| } | | |
| CRC_16 | 16 | |

*FIG. 10*

| Field | Size (bits) |
|---|---|
| FRAME_IDX | 8 |
| SUB_SLICE_INTERVAL | 22 |
| TYPE_2_START | 22 |
| L1_CHANGE_COUNTER | 8 |
| START_RF_IDX | 3 |
| For i=0..NUM_PLP_IN_L1DYN { | |
|     PLP_ID | 8 |
|     PLP_START | 22 |
|     PLP_NUM_BLOCKS | 10 |
| } | |
| For i=0..NUM_AUX-1 { | |
|     AUX_RFU | 16 |
| FEF_INTERVAL | |
| } | |
| NUM_PLP_ext | 8 |
| NUM_IDLE_PLP | 8 |
| CRC_16 | 16 |

*FIG. 11*

| Field | Size (bits) |
|---|---|
| For i+0..NUM_PLP_ext { | |
|     PLP_ID | 8 |
|     PLP_START | 22 |
|     PLP_NUM_BLOCKS | 10 |
| } | |
| For i=0..NUM_IDLE_PLP { | |
|     PLP_ID | 8 |
|     PLP_DELTA | 8 |
| } | |
| CRC_16 | 16 |

*FIG. 12*

L1 - CONFIG

| Field | Size (bits) |
|---|---|
| NUM_PLP | 8 |
| NUM_FIZ | 3 |
| NUM_TIFS_a | 8 |
| NUM_AUX | 4 |
| AUX_CONFIG_RFU | 8 |
| For i=0..NUM-RF-1 { | |
|     RF_IDX | 3 |
|     FREQUENCY | 32 |
| } | |
| IF S2=="xxxI" { | |
|     FEF_TYPE | 4 |
|     FEF_LENGTH | 22 |
|     FEF_INTERVAL | 8 |
| } | |
| For i=0 .. NUM_PLP - 1 { | |
|     PLP_ID | 8 |
|     PLP_TYPE | 3 |
|     PLP_PAYLOAD_TYPE | 5 |
|     PLP_GROUP_ID | 8 |
|     PLP_COD | 3 |
|     PLP_MOD | 3 |
|     PLP_ROTATION | 1 |
|     PLP_FEC_TYPE | 2 |
|     PLP_TIF_NUM_BLOCKS | 10 |
| } | |
| For i=0..NUM_AUX-1 { | |
|     AUX_RFU | 32 |
| } | |
| For i=0..NUM_FIZ{ | |
|     FIZ_LENGTH | 10 |
|     FIZ_MAPPING_TYPE | 1 |
| } | |
| CRC_16 | 16 |

FIG. 13

L1 - DYNAMIC

| Field | Size (bits) |
|---|---|
| FRAME_IDX | 8 |
| L1_CHANGE_COUNTER | 8 |
| For i=0..NUM_TIFS_a{ | |
|     PLP_ID | 8 |
|     PLP_TIFS_START | 21 |
|     PLP_TIFS_LENGTH | 15 |
|     PLP_TIFS_TYPE | 2 |
|     PLP_TIFS_FRAME_IDX | 1 |
|     PLP_TIFS_DELTA | 4 |
|     FIZ_ID | 3 |
| } | |
| For i=0..NUM_AUX-1 { | |
|     AUX_RFU | 16 |
| } | |
| NUM_TIFS_ext | 8 |
| NUM_IDLE_PLP | 8 |
| CRC_16 | 16 |

Rows for PLP_ID through FIZ_ID braced as 44. NUM_TIFS_ext and NUM_IDLE_PLP braced as 46.

*FIG. 14*

L1 - DYNAMIC-Ext

| Field | Size (bits) |
|---|---|
| For i=0..NUM_TIFS_ext{ | |
|     PLP_ID | 8 |
|     PLP_TIFS_START | 21 |
|     PLP_TIFS_LENGTH | 15 |
|     PLP_TIFS_TYPE | 2 |
|     PLP_TIFS_FRAME_IDX | 1 |
|     PLP_TIFS_DELTA | 4 |
|     FIZ_ID | 3 |
| } | |
| For i=0..NUM_IDLE_PLP{ | |
|     PLP_ID | 8 |
|     PLP_DELTA | 8 |
| } | |
| CRC_16 | 16 |

Rows braced as 48.

*FIG. 15*

INBAND SIGNALLING

| Field | Size (bits) | |
|---|---|---|
| PADDING_TYPE | 8 | |
| PLP_L1_CHANGE_COUNTER | 8 | |
| NUM_IS_TIFS | 4 | |
| For i=0..NUM_IS_TIFS | | |
|     PLP_TIFS_START | 21 | |
|     PLP_TIFS_LENGTH | 15 | |
|     PLP_TIFS_TYPE | 2 | 50 |
|     PLP_TIFS_FRAME_IDX | 2 | |
|     PLP_TIFS_DELTA | 4 | |
|     FIZ_ID | 3 | |
| } | | |
| CRC_16 | 16 | |

*FIG. 16*

L1 - PRE

| Field | Size (bits) |
|---|---|
| Type | 8 |
| BWT_EXT | 1 |
| S1 | 3 |
| S2 | 4 |
| L1_Repetition_Flag | 1 |
| PAPR | 4 |
| PZ0_PILOT_PATTERN | 4 |
| PZ0_GUARD_INTERVAL | 3 |
| NUM_PZ | 3 |
| L1_CONFIG_MOD | 4 |
| L1_CONFIG_COD | 2 |
| L1_CONFIG_FEC_TYPE | 2 |
| L1_CONFIG_SIZE | 18 |
| L1_DYN_MOD | 4 |
| L1_DYN_COD | 2 |
| L1_DYN_FEC_TYPE | 2 |
| L1_DYN_SIZE | 18 |
| L1_DYN_INFO_SIZE | 18 |
| L1_DYN_EXTENSION | 1 |
| TX_ID_AVAILABILITY | 8 |
| CELL_ID | 16 |
| NETWORK_ID | 16 |
| T2_SYSTEM_ID | 16 |
| NUM_T2_FRAMES | 8 |
| NUM_DATA_SYMBOLS | 12 |
| REGEN_FLAG | 3 |
| Reserved | 10 |
| CRC_32 | 32 |

Rows PZ0_PILOT_PATTERN through NUM_PZ grouped as 52.

FIG. 17

L1 - CONFIG

| Field | Size (bits) |
|---|---|
| NUM_PLP | 8 |
| NUM_FIZ | 3 |
| NUM_TIFS_a | 8 |
| NUM_AUX | 4 |
| AUX_CONFIG_RFU | 8 |
| For i=0..NUM-RF-1 { | |
|     RF_IDX | 3 |
|     FREQUENCY | 32 |
| } | |
| IF S2=="xxxI" { | |
|     FEF_TYPE | 4 |
|     FEF_LENGTH | 22 |
|     FEF_INTERVAL | 8 |
| } | |
| For i=0 .. NUM_PLP - 1 { | |
|     PLP_ID | 8 |
|     PLP_TYPE | 3 |
|     PLP_PAYLOAD_TYPE | 5 |
|     PLP_GROUP_ID | 8 |
|     PLP_COD | 3 |
|     PLP_MOD | 3 |
|     PLP_ROTATION | 1 |
|     PLP_FEC_TYPE | 2 |
|     PLP_TIF_NUM_BLOCKS | 10 |
| } | |
| For i=0..NUM_AUX-1 { | |
|     AUX_RFU | 32 |
| } | |
| For i=0..NUM_FIZ{ | |
|     FIZ_LENGTH | 10 |
|     FIZ_MAPPING_TYPE | 1 |
| } | |
| For i=0..NUM_PZ{ | |
|     PZ_FFT_SIZE | 4 |
|     PZ_PILOT_PATTERN | 1 |
|     PZ_GUARD_INTERVAL | 1 |
| } | |
| CRC_16 | 16 |

*FIG. 18*

METHOD AND APPARATUS FOR TRANSMITTING/RECEIVING DATA STREAM IN BROADCAST SYSTEM

PRIORITY

This application claims priority under 35 U.S.C. §119(a) to a GB Patent Application filed in the UK Intellectual Property Office on Dec. 13, 2010 and assigned Serial No. GB 1021115.9, and a Korean Patent Application filed in the Korean Intellectual Property Office on Nov. 24, 2011 and assigned Serial No. 10-2011-0123470, the entire disclosures of which are incorporated herein by reference.

BACKGROUND OF THE INVENTION

1. Field of the Invention

The present invention relates generally to broadcast systems, and more particularly, to a method and apparatus for transmitting and receiving a data stream in digital video broadcast systems.

2. Description of the Related Art

A broadcast system, such as a Digital Video Broadcasting (DVB) system, may transmit data in the form of a sequence of frames. A DVB system may operate according to, for example, a DVB Terrestrial $2^{nd}$ Generation (DVB-T2) standard, Advanced Televisions Systems Committee (ATSC), Integrated Services Digital Broadcasting (ISDB), or Digital Multimedia Broadcasting (DMB). Each frame typically includes a preamble section and a data section. The preamble section and the data section are time-multiplexed. The data section may carry data arranged in the form of a number of data streams, which may be referred to as Physical Layer Pipes (PLP). A PLP or a plurality of PLPs may carry, for example, a service such as a video channel that is to be provided to a user. Reception of data from the frames, and reception of the data streams, may be assisted by signalling, which may typically be carried in the preamble of the frame, in which case the signalling is referred to as Out-of-Band (OB) signalling. The signalling may also be carried in the data section, in which case the signalling is referred to as In-Band (IB) signalling. The signalling may be referred to as physical layer signalling, or Layer 1 (L1) signalling. The signalling may indicate a modulation or coding scheme to be used for decoding data, and it may, for example, indicate sections of a data field to be decoded, or the location of a data stream within the data section.

The use of signal compression techniques has increased, and lower data rate services, which may be more robust in particular in mobile environments, have been provided. Accordingly, the number of data streams carried by a sequence of frames is potentially large, but thinly spread in the sense that not every frame may carry all of the data streams. Because signalling is typically required relating to each data stream for each frame, the signalling may represent a large overhead per frame in terms of data capacity and receiver power consumption.

Furthermore, since data streams are typically frequency interleaved within symbols transmitted in a data frame, it is necessary for a receiver to receive the whole symbol bandwidth in order to receive a data stream. As a result, the sampling rate used at the receiver is typically required to be sufficient to receive the whole symbol bandwidth, which places demands on the power consumption of the receiver. The power consumption of the receiver is related to the sampling rate. Power consumption is a particularly important parameter, in particular for battery-powered digital broadcasting receivers. Data streams may also be time interleaved within data blocks, and mapping of the data blocks to data frames for transmission may be inefficient.

SUMMARY OF THE INVENTION

The present invention has been made to address at least the above problems and/or disadvantages and to provide at least the advantages described below. Accordingly, an aspect of the present invention provides a method and apparatus for efficiently transmitting/receiving data streams in a digital broadcast system.

In accordance with a first aspect of the present invention, a method is provided for transmitting data having a data stream in a broadcast system. The data stream is segmented into a plurality of segments of the data stream. A frame is generated. The frame includes a preamble section and a data section. The data section carries the data stream, and the preamble section carries signalling information. The frame is transmitted to a receiver. In generating the frame, the data section of the frame is segmented into a plurality of frequency zones, and at least one segment of the data stream is mapped to a frequency zone of the plurality of frequency zones. The signalling information includes first segmentation information of the data stream and second segmentation information of the plurality of frequency zones.

According to another aspect of the present invention, a method is provided for receiving data having a data stream in a broadcast system. A frame is received. The frame includes a preamble section and a data section. The data section carries the data stream. The preamble section carries signalling information. The data section is segmented into a plurality of frequency zones. The frame is demodulated. The data stream is segmented into a plurality of segments of the data stream, and a segment of the data stream is mapped to a frequency zone of the plurality of frequency zones. The signalling information includes first segmentation information of the data stream and second segmentation information of the plurality of frequency zones.

According to an additional aspect of the present invention, a transmitter is provided for transmitting data having a data stream in a broadcast system. The transmitter includes a segmenting and mapping unit for segmenting the data stream into a plurality of segments of the data stream and for mapping at least one segment of the data stream onto a segmented frequency zone of a plurality of frequency zones. The transmitter also includes a signalling generation block for delivering signalling information. The transmitter further includes an Orthogonal Frequency Division Multiplexing (OFDM) generation unit for mapping the plurality of segments of the data stream and the signalling information onto OFDM resources. The signalling information includes first segmentation information of the data stream and second segmentation information of the plurality of frequency zones.

According to a further aspect of the present invention, a receiver is provided for receiving data having a data stream in a broadcast system. The receiver includes a signal processing unit for processing a received signal for demodulation. The received signal includes at least one frame. The frame includes a preamble section and a data section. The data section carries the data stream. The preamble section carries signalling information. The data section is segmented into a plurality of frequency zones. The receiver also includes a controller for controlling the signal processing unit to process the signalling information and a segment of the data stream. The segment of the data stream is received via a segmented frequency zone of the plurality of frequency zones. The receiver further includes a demodulator for demodulating the segmented data stream and the signalling information. The signalling information includes first segmentation information of the data stream and second segmentation information of the plurality of frequency zones.

BRIEF DESCRIPTION OF THE DRAWINGS

The above and other aspects, features and advantages of the present invention will be more apparent from the following detailed description when taken in conjunction with the accompanying drawings, in which:

FIG. 10 is a table showing the L1-config signalling field, according to an embodiment of the present invention;

FIG. 11 is a table showing the L1-dynamic signalling field, according to an embodiment of the present invention;

FIG. 12 is a table showing the L1-dynamic-Ext signalling field, according to an embodiment of the present invention;

FIG. 13 is a table showing the L1-config signalling field, according to an embodiment of the present invention;

FIG. 14 is a table showing the L1-dynamic signalling field, according to another embodiment of the present invention;

FIG. 15 is a table showing a further example of the L1-dynamic-Ext signalling field, according to another embodiment of the present invention;

FIG. 16 is a table showing IB signaling, according to an embodiment of the present invention;

FIG. 17 is a table showing the L1-pre-signalling field, according to an embodiment of the present invention; and FIG. 18 is a table showing the L1-config signalling field, according to an embodiment of the present invention.

DETAILED DESCRIPTION OF EMBODIMENTS OF THE PRESENT INVENTION

Figure 1:
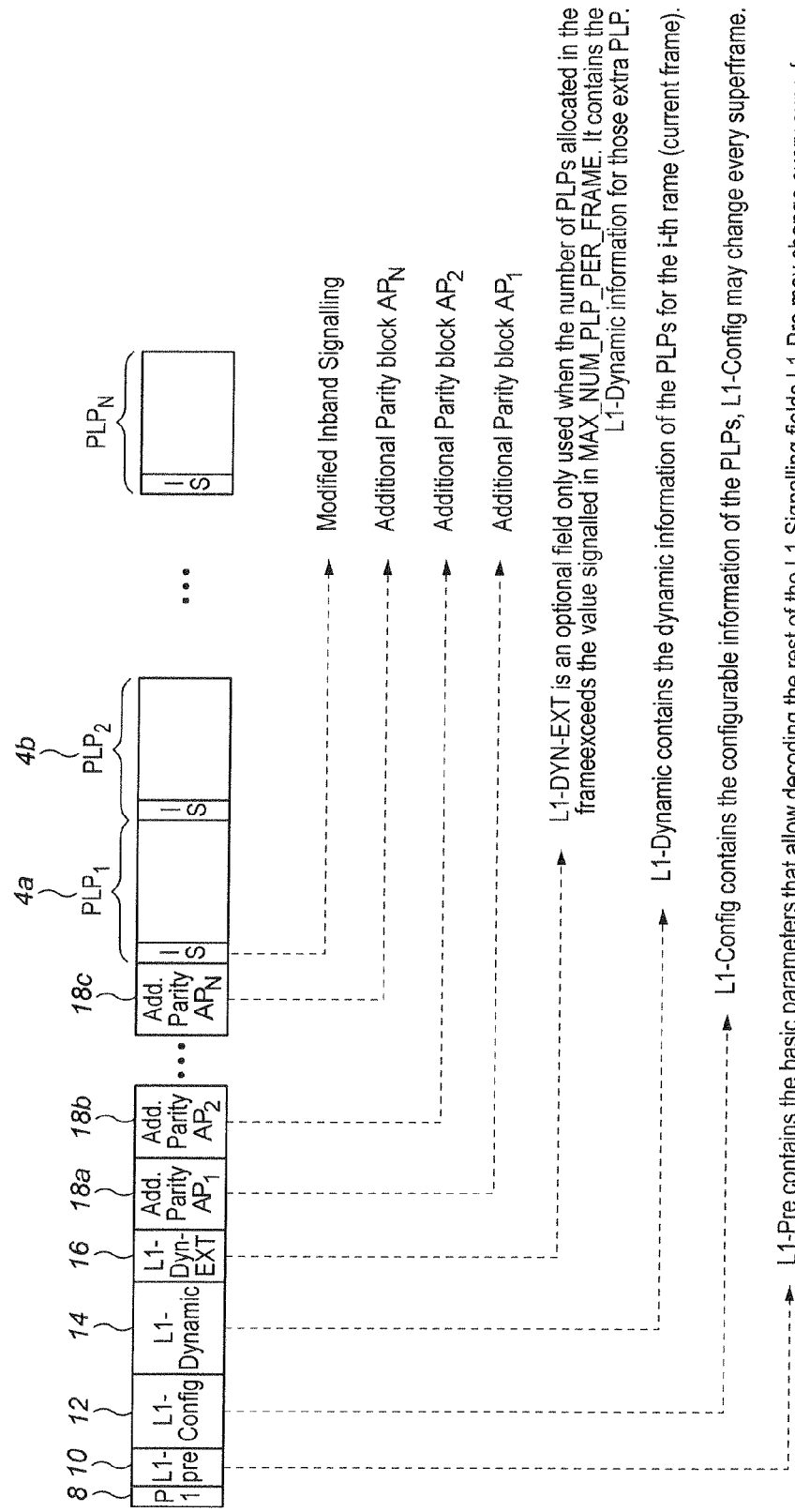
FIG. 1 is a diagram illustrating a data frame, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention are described in the context of a Digital Video Broadcasting Next Generation Handheld (DVB-NGH) standard based on the $2^{nd}$ generation terrestrial DVB-T2 system.

However, the above context is provided by way of example only, and other embodiments may involve other broadcast systems. The embodiments of the present invention are not limited to the use of transmitting of digital video signals.

In an embodiment of the present invention, several data streams, which may be embodied as PLPs, are mapped onto a super-frame, which is made up of a series of frames.

FIG. 1 is a diagram illustrating a data frame, according to an embodiment of the present invention. Specifically, FIG. 1 shows a frame structure of a given one of the frames in the super-frame.

Referring to FIG. 1, the data frame includes a preamble section and a data section. The preamble section includes P1 signaling field 8, L1-pre-signaling field 10, L1-config signaling field 12, L1-dynamic signaling field 14, L1-dynamic EXT signaling field 16, Add parity AP1-APN signaling field 18a through 18c, and further additional parity fields as indicated. The data section includes PLPs PLP1 4a, PLP2 4b and so on, i.e., PLPN. The PLPs are shown to be arranged sequentially in time, but in practice the PLPs may overlap in time and be multiplexed in frequency, for example.

Typically, the L1-Pre signaling field 10 contains signalling information relating at least to the modulation and coding scheme needed to receive the remainder of the preamble. The remainder of the preamble section contains information necessary to receive the data section, and in particular, the PLPs, within the data section. The information necessary for receiving the physical layer pipes may contain, for example, the start address of a PLP within the data section. The signalling information within the preamble may be referred to as OB signalling.

The L1 config signaling field 12 typically carries information that is valid for each frame of the super-frame, and is typically the same for each frame of the super-frame. The L1-dynamic signaling field 14 information typically varies from frame to frame, and relates to decoding the PLPs within the frame. For example, the L1-dynamic signaling field 14 will include a start address of the PLP. As data compression techniques improve, and as lower data rates and more robust services are offered for reception by, in particular, handheld and mobile user equipment, the number of PLPs mapped onto a super-frame is increasing. However, each PLP, or data stream, may not be mapped to every frame. Carrying signalling information, and in particular L1-dynamic signaling field 14, relating to each PLP in each frame may involve a significant overhead in terms of signalling information.

A first signaling information field, L1-dynamic signaling field 14, is provided for assisting in the reception of a first number of data streams. If required, a second signaling information field, L1 dynamic EXT signaling field 16, is provided for assisting in the reception of further data frames. The signalling information carried in the signalling information field typically includes L1-dynamic signaling field information. The number of data streams for which signalling information is carried in the first signalling information field is less than or equal to a limit applicable to each of the frames in the super-frame. The first signaling information field is the same size for each of the frames in the super-frame.

When the first signalling information field is the same size for each of the plurality of frames, the size may be set at a value that is sufficiently large to give robustness due to frequency diversity. When information is included in a second signalling information field, which is dependent on the number of data streams for the given frame being greater than a limit, additional information may be transmitted beyond the capacity limit of the first signalling information field. Accordingly, the first signalling information field is maintained at a sufficient size to give robustness due to frequency diversity, while the second signalling information field may accommodate extra capacity if required. The second signalling information field may be less robust than the first signalling information field, if the size of the second signalling information field is smaller than the first signalling information field.

The first signalling information field may carry an indication as to whether a second signalling information field is to be transmitted and may also carry an indication as to a length of the second signalling information field. This allows a receiver to inhibit reception of the second signalling information field if it is not to be transmitted, and may prepare for reception of the second signalling information field if it is to be transmitted. The second signalling information field may carry an indication of data streams that are idle. A receiver may inhibit reception of a frame that does not carry a data stream that is required to be received, thereby saving power consumption.

The limit to the number of data streams for which signalling information is carried in the first signalling information field is typically determined based on statistical information relating to a number of active or idle data streams per frame for the plurality of frames, and/or based on at least a robustness of a scheme employed for the transmission of at least one of the first and second signalling information fields. The robustness scheme may include at least one of a modulation and coding scheme, a Multiple-Input Multiple-Output (MIMO) scheme, a Fast Fourier Transform (FFT) size, a pilot pattern, and a guard interval. The limit to the number of data streams for which information is carried in the first signalling information field is determined in accordance with the robustness of the transmission of the field, so that a lower limit to the size the first signalling information field may be set to a sufficient size to give adequate robustness taking into account frequency diversity and robustness of the transmission scheme. The first signalling information field may also be set to a size that is sufficiently large, such that it may accommodate an expected amount of signalling information related to active and passive data streams per frame, so that any overflow of signalling information beyond the expected amount may be carried in the second signalling information field. An indication of the limit may be carried in the preamble section of each frame, typically in the L1-config signalling field 12.

As described above, the first signalling information field may have a higher robustness than the second signalling information field, due to a greater degree of frequency diversity, since the first signalling information field is typically interleaved over a larger frequency range. Thus, it may be advantageous to include preferential signalling information in the first signalling information field that relates to data streams requiring higher robustness.

Figure 2:
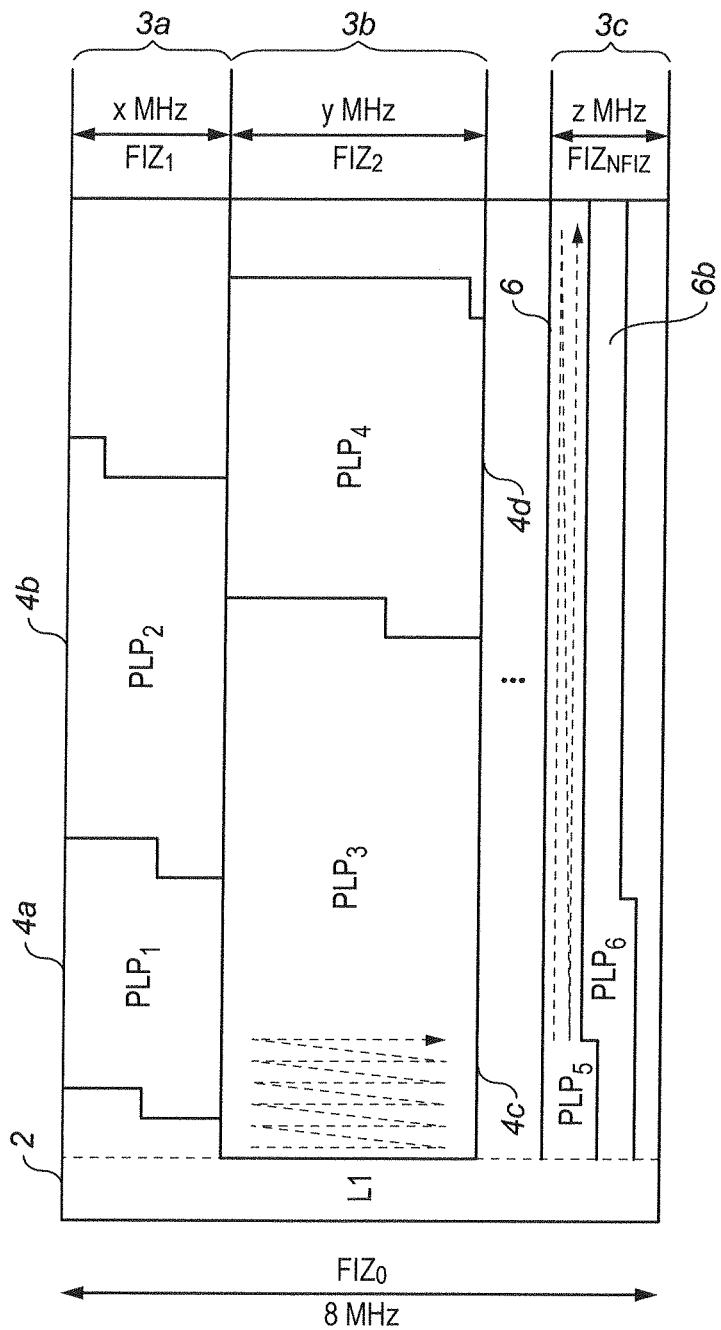
FIG. 2 is a diagram illustrating signaling in a data frame, according to an embodiment of the present invention.

FIG. 2 illustrates a frame structure, according to an embodiment of the present invention.

Referring to FIG. 2, the vertical axis represents frequency, and the horizontal axis represents time. At the physical layer, the frame consists of a succession of Orthogonal Frequency Division Multiplexing (OFDM) symbols. Each OFDM symbol includes a number of subcarriers arranged at different frequencies within the frequency band of a symbol ($FIZ_0$ in FIG. 2, and 8 MHz in this embodiment of the present invention).

A preamble region 2 occupies the full width in frequency of the symbol. The remaining zone of the preamble region 2 is a data section, and carries a number of data streams that are mapped to the data section. The data section is segmented into a number of frequency zones, referred to as frequency interleaving zones, shown as $FIZ_1$ 3a, $FIZ_2$ 3b and $FIZ_{NFIZ}$ 3c in FIG. 2. The preamble region 2 carries signalling information that is used to receive the data streams within the data section. Each frequency zone has the same position in a frequency domain for each of the plurality of frames in a super-frame.

The data streams are mapped to the frequency zones, and typically, a data stream is mapped to a single frequency zone. Specifically, $PLP_1$ 4a and $PLP_2$ 4b are mapped to $FIZ_1$ 3a, $PLP_3$ 4c and $PLP_4$ 4d are mapped to $FIZ_2$ 3b, and $PLP_5$ 6 and $PLP_6$ 6b are mapped to $FIZ_{NFIZ}$.

A signalling information word, which carries signalling relating to a position and bandwidth of at least the first frequency zone in a frequency domain to assist in the reception of the data stream, is carried in the preamble section of at least the first frame of super-frame. However, the signalling information word is typically carried in the L1-config signalling field 12 of each frame.

Accordingly, the pre-amble, carrying the signalling information word is transmitted within a wider frequency bandwidth (i.e., the full symbol bandwidth) than each of the frequency zones. This allows the receiver to use a reduced bandwidth and also a reduced sampling rate to receive the data stream, saving power consumption. However, using the full symbol bandwidth to receive the preamble section may avoid the need to duplicate information in the preamble between frequency zones, which may be needed if the receiver were to use the bandwidth of the frequency zone throughout.

A further advantage arising from reducing the transmission bandwidth, and consequently increasing a transmission time period, may be in terms of increased robustness, particularly in a mobile environment. Specifically, it may be advantageous to trade-off time and frequency diversity by reducing bandwidth and increasing a transmission time period, thereby trading a reduction in frequency diversity for a gain in time diversity.

IB signalling may be included in the data streams of a frame. This allows the signalling information, and in particular the L1-dyn signalling field 14, to be received within the bandwidth of a frequency zone. Accordingly, a receiver may maintain the second bandwidth for the reception of the data stream (after initially receiving the preamble in the wider bandwidth, typically in the first frame), thereby saving power consumption.

As illustrated in FIG. 2, each frequency zone is mapped to sub-carriers of a transmission symbol that are contiguous in frequency. Accordingly, the frequency band occupied by a mapped frequency zone is minimised. It would be wasteful of receiver bandwidth to leave gaps in the frequency domain.

Data is typically interleaved in frequency, and the frequency interleaving sequence may vary from one OFDM symbol to another. This may provide greater robustness. Typically, pilot tones are inserted into the transmission symbol in a pattern that is independent of the segmentation of the data section of each of the plurality of frames into frequency zones. This simplifies the transmitter and receiver implementation, because the segmentation may be carried out independently from the arrangement of the physical layer.

As part of the process of determining bandwidths to be used for a frequency zone, which is typically done for a super-frame, a lower limit may be determined based on an arrangement of pilot tones mapped to the frequency zone. In this way, a minimum robustness may be maintained for the transmission of the first frequency zone, since the robustness is dependent on the arrangement of the pilot tones. It may be required that a certain number of pilot tones fall within the part of a symbol to which the first frequency zone is mapped.

The segmenting of the data section of each frame may be done at logic frame level, so that the implementation of a transmitter and a receiver may be simplified and the bandwidth and position of frequency zones may be allocated flexibly.

If the data stream includes components of a scalable video coding scheme, it is preferable to map the components to the same frequency zone in a given frame. This mapping is performed so that a receiver may fall back to a more robust component, or select a higher rate component, without changing the bandwidth used by the receiver.

In addition to segmenting the data section of each frame into frequency zones, i.e., frequency interleaving zones, the data section may also be segmented into a number of time zones, or Time Interleaving (TI) Frame Segments (TIFSs). The data streams may first be mapped onto TI frames.

Figure 3:
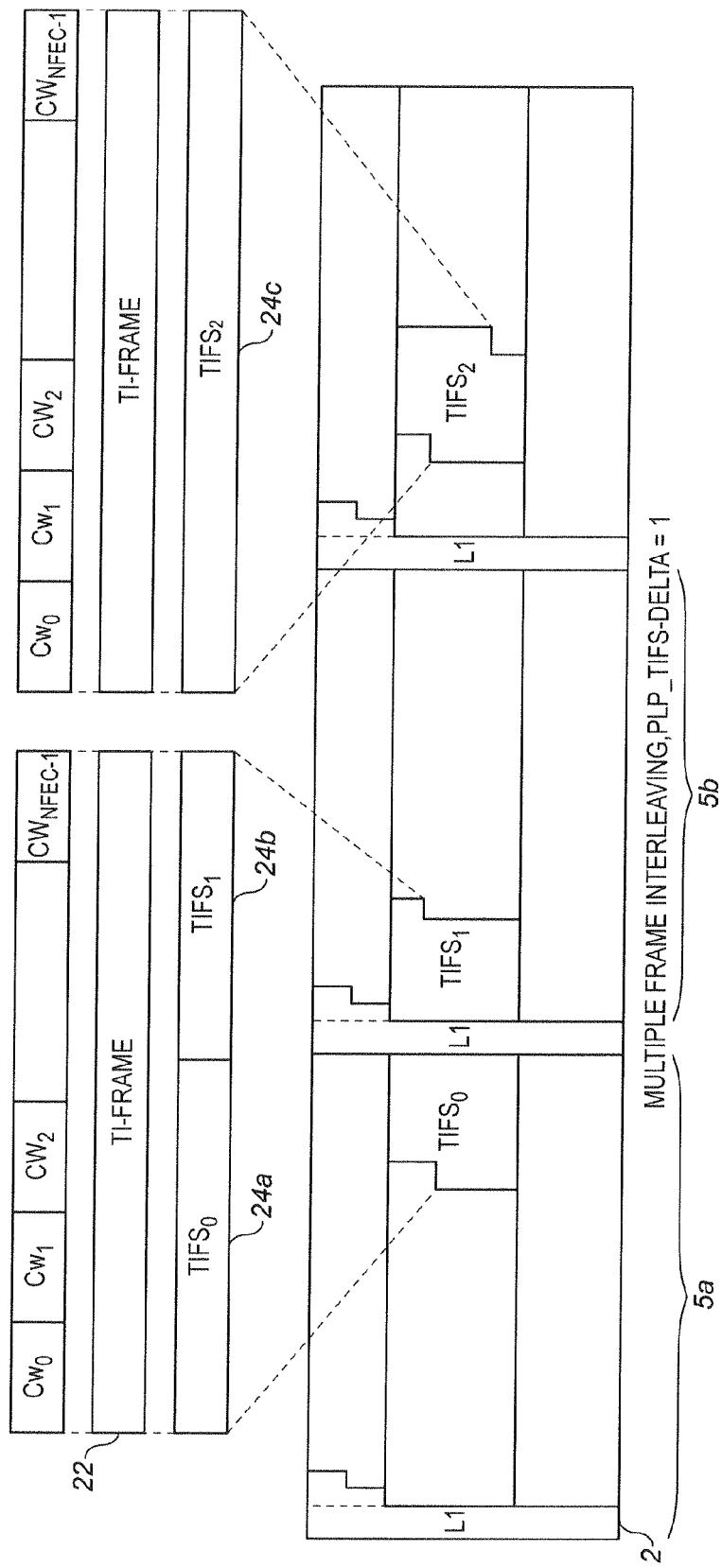
FIG. 3 is a diagram illustrating mapping of time interleaving frame segments to frequency interleaving zones, according to an embodiment of the present invention.

FIG. 3 illustrates mapping of time interleaving frame segments to frequency interleaving zones, according to an embodiment of the present invention.

Referring to FIG. 3, a TI frame 22 may be then be mapped to TIFSs 24a, 24b, 24c. A second signalling information word which carries signalling relating to the position of at least one of the TIFSs within a given frame may be included in the preamble section of the given frame, typically within the L1-config signalling field 12.

If a TI frame, or a number of TI frames, were to be mapped directly onto a frequency interleaving zone, then padding may need to be included in the frequency interleaving zone if the amount of data carried by the TI frame or frames is not the same as the capacity of the frequency interleaving zone. The padding would be wasted capacity, since it may not carry data. In an embodiment of the present invention, as a result of the mapping of TI frames to TIFSs, the need to add padding in a frequency zone may be avoided, since the capacity of each TIFS may be arranged to fill a remaining part of a frame efficiently. For example, in FIG. 3, a TI frame 22 is mapped to both the $TIFS_0$ 24a and the $TIFS_1$ 24b. The $TIFS_0$ 24a is mapped to fill remaining capacity in a frequency interleaving zone of a first frame 5a, and the $TIFS_1$ 24b is mapped to a second frame 5b. Specifically, each frame is divided into time-frequency blocks, and the TIFSs are mapped to time-frequency blocks. A time-frequency block is a block of adjacent time-frequency resources and each time-frequency block may typically have the same position in time and frequency for each of the frames.

The mapping of the TI frame 22 to the TIFSs 24a, 24b and to the frames 5a, 5b may be done in real time, so that flexible scheduling may be realized, in which it is not necessary to determine the number of TIFSs per frame, or over how many frames the TI frame is mapped. The TI frame may be mapped to start and end at any point within a frame and at any point within a super-frame, without the need to fix these points in advance.

The second signalling information word may carry information relating to a timing of a subsequent TIFS, so that a receiver may inhibit reception of periods between TIFSs, thereby saving on power consumption, and so that the receiver may be prepared to receive subsequent TIFSs.

Figure 4:
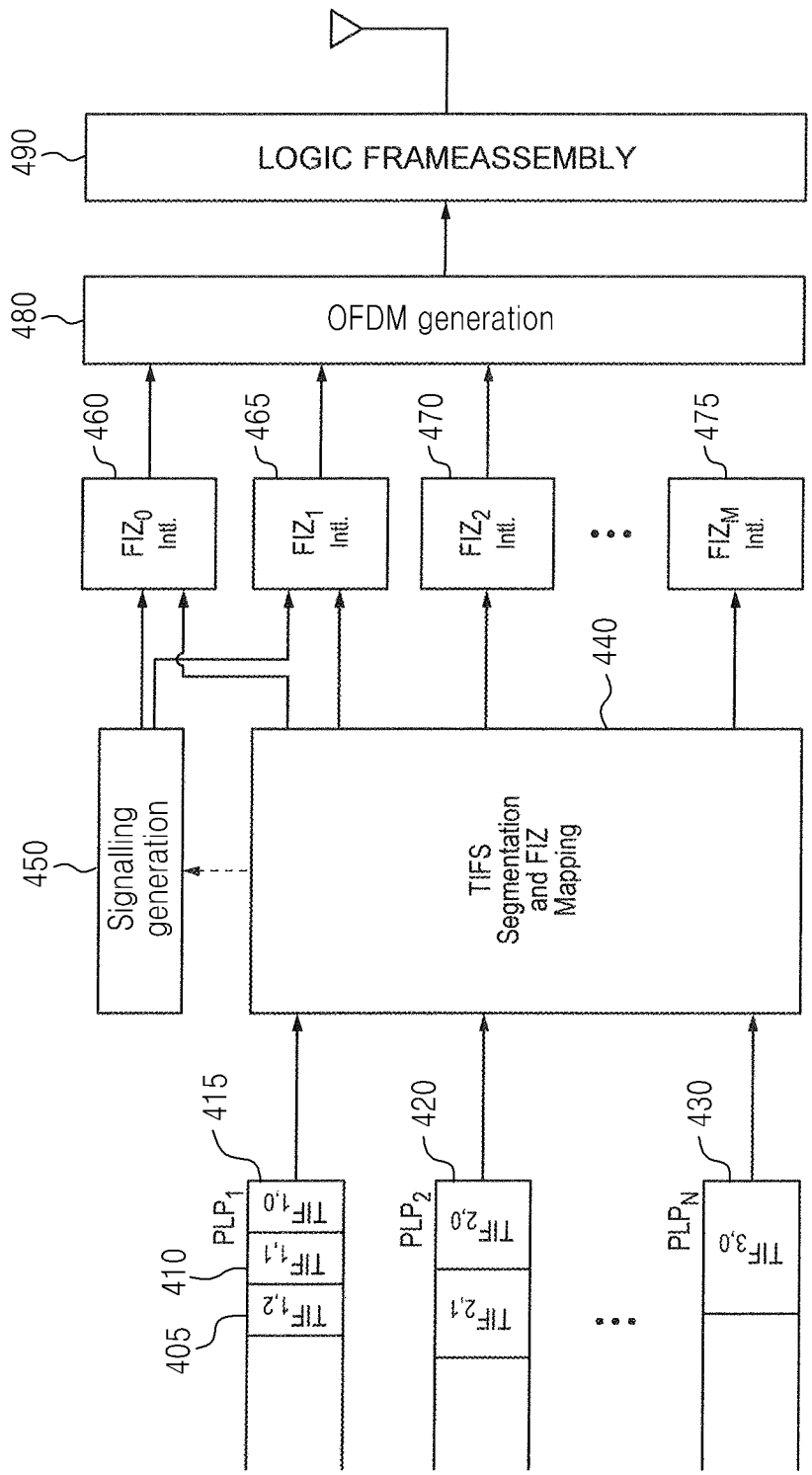
FIG. 4 is a diagram illustrating a transmitter, according to an embodiment of the present invention.

FIG. 4 is a diagram illustrating a transmitter, according to an embodiment of the present invention. Specifically, FIG. 4 illustrates a typical transmitter architecture to allow segmentation into frequency zones and TIFSs.

A data stream consists of different PLPs, 400, 420, 430, and each PLP consists of consecutive TI frames. For example, $PLP_1$ 400 includes $TIF_{1.0}$ 405, $TIF_{1.1}$ 410, ... $TIF_{1.N}$ 415. The data of each TIF is interleaved according to the predefined time interleaver.

A TIFS Segmentation and FIZ Mapping block 440 arranges several PLPs 400, 415, 430 into a specific FIZ 460, 465, 470, 475. Different PLPs of the FIZ are interleaved by the predefined frequency interleaver, according to the FIZ.

A signalling generation block 450 contains the information of the logical frame structure related to PLP, TIF and FIZ.

An OFDM generation block 480 constructs the block of OFDM cells, thereby building of the OFDM grid. The OFDM generation block receives signalling information and a data stream, and maps the signalling information and data stream onto the OFDM resource. Typically OFDM generation block includes a pilot insertion block 485, which adds pilots into the transmitted frame depending pilot pattern, IFFT block, and Guard Insertion block.

A Logic Frame Assembly block 490 includes a logical frame structure by assembling the different TIFSs and FIZ. For example, FIG. 2 describes the logical frame structure, which is the output of the Logic Frame Assembly block 490.

Figure 5:
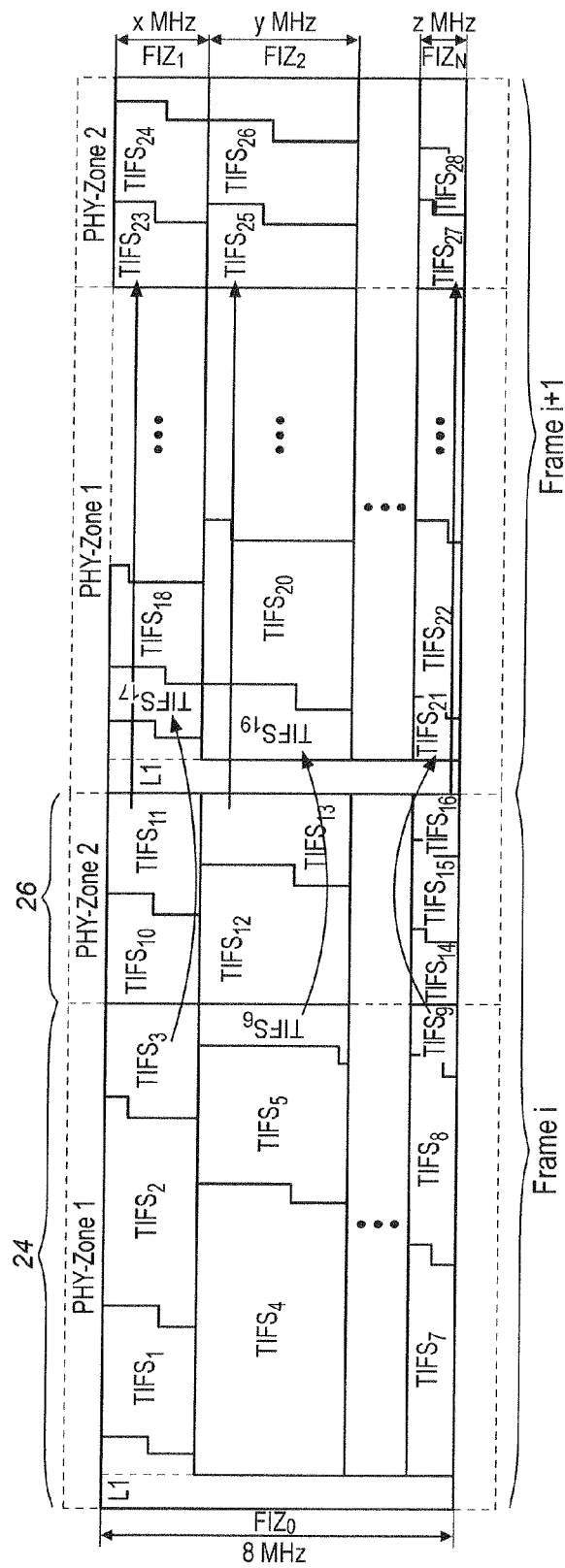
FIG. 5 is a diagram illustrating mapping of frequency interleaving zones to physical layer zones, according to an embodiment of the present invention.

FIG. 5 is a diagram illustrating mapping of frequency interleaving zones to physical layer zones, according to an embodiment of the present invention.

Referring to FIG. 5, each frame may be divided into at least one physical layer zones PHY-Zone 1, 24, and PHY-Zone 2, 26, having different physical layer characteristics. The physical characteristics are varied between zones to give different levels of robustness, so that a mobile hand held receiver, for example, may receive a more robust zone, whereas a fixed receiver having a good antenna may receive a higher capacity zone. The physical characteristics may vary between zones in terms of FFT size, number of pilot tones, pattern of pilot tones, MIMO scheme and guard interval. Preferably, each of the plurality of frequency zones maps to a frequency bandwidth that is the same for each physical layer zone. This allows a receiver to use the same bandwidth to receive a frequency zone within each physical layer zone of a frame.

Each time an interleaved frame segment may be mapped to a single physical layer zone in a given frame.

Interleaving within a frequency interleaving zone and/or within a TIFS may be frequency-wise interleaving, so that successive parts of a data stream are mapped across parts of an OFDM symbol in frequency. The mapping may then moves on to map to parts of another orthogonal frequency division multiplexing symbol in frequency, and so on. Alternatively, the mapping may be time-wise interleaving, so that successive parts of a data stream are mapped in time across a succession of OFDM symbols, and then typically the mapping moves on to map in time to other frequency parts of the succession of OFDM symbols, and so on.

In a receiver, a bandwidth of an analog filter and a sampling frequency, appropriate to the second bandwidth, may be set based on the signalling information word, so that the receiver may be arranged for a minimum power consumption consistent with the bandwidth of the frequency zone to be received.

Figure 6:
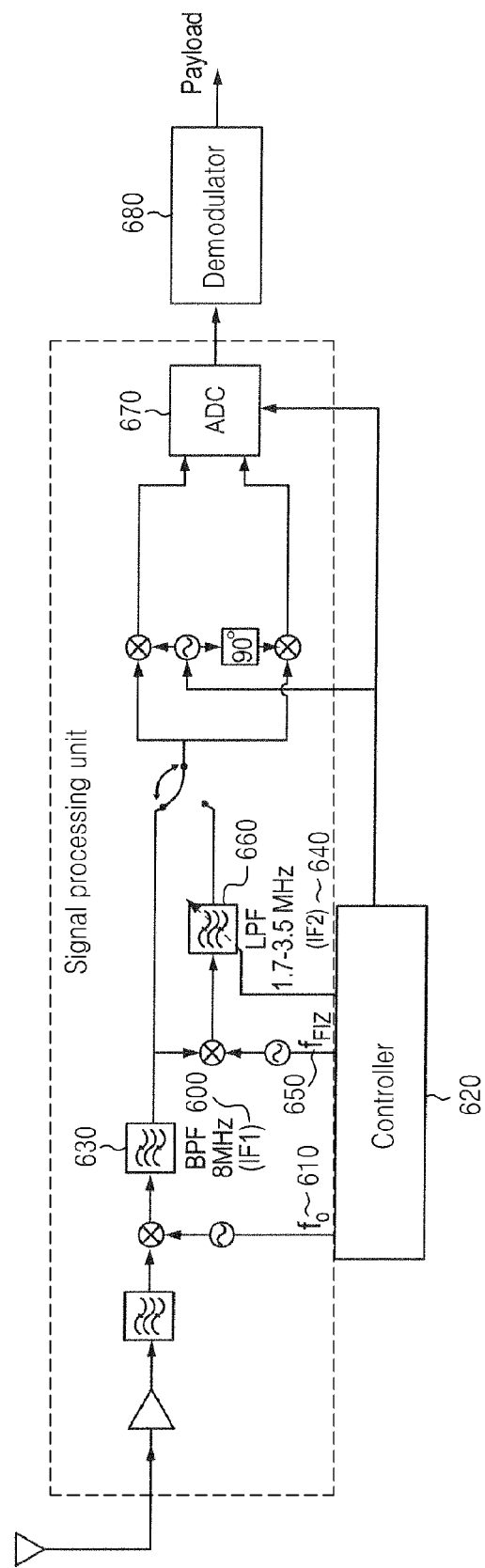
FIG. 6 is a diagram illustrating a receiver, according to an embodiment of the present invention.

FIG. 6 is a diagram illustrating a receiver, according to an embodiment of the present invention. Specifically, FIG. 6 illustrates a receiver for receiving data frames having variable bandwidth frequency zones.

The receiver has a signal processing unit. The signal processing unit generally includes a down-converter to convert the received signal into Intermediate Frequency 1 (IF1) 600 for baseband demodulation. The received signal is down-converted on a desired frequency (fo) 610 controlled by a controller 620. The down-converted signal is filtered through a Baseband Pass Filter (BPF) 630. The filtered signal then has 8 MHz bandwidth defined by the broadcasting system. The output of BPF is converted into Intermediated Frequency 2 (IF2) 640 and is filtered through a Low Pass Filter (LPF) 650. The IF2 640 and frequency of FIZ ($f_{FIZ}$) 650 are also controlled by the controller 620. The output signal of LPF 660 has a narrow bandwidth, e.g., 1.7 to 3.5 MHz. An Analog to Digital Converter (ADC) 670 translates an analog output signal of FIZ 650 into a digital signal. The digital signal is demodulated by a demodulator 680.

Figure 7:
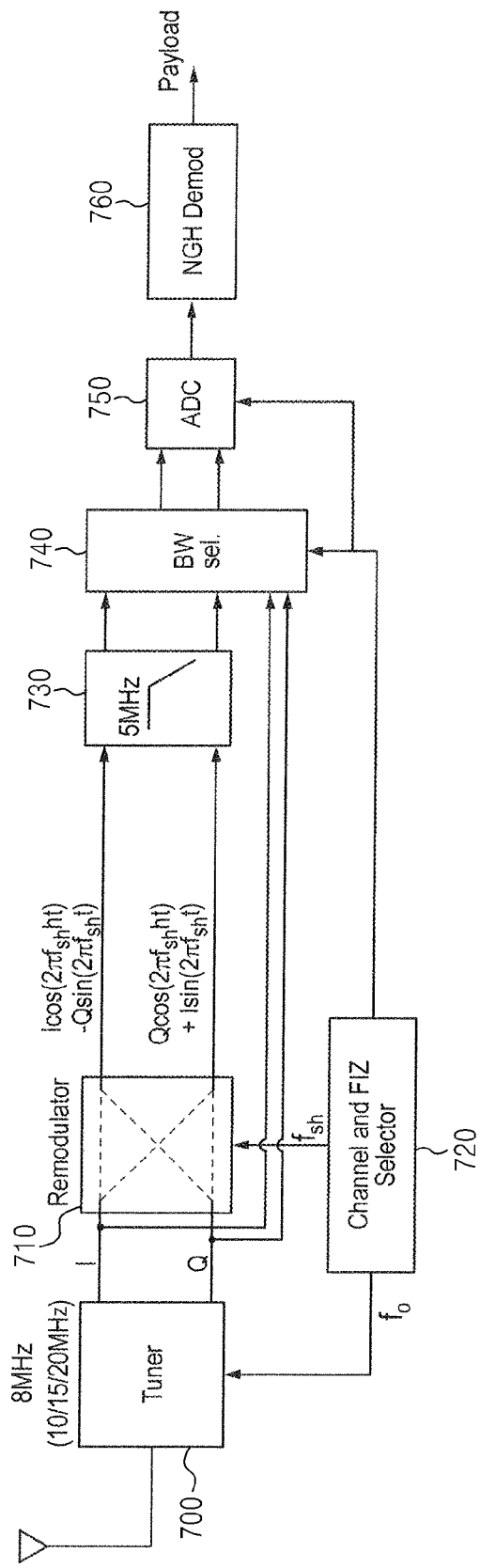
FIG. 7 is a diagram illustrating a receiver, according to another embodiment of the present invention.

FIG. 7 is a diagram illustrating a receiver, according to another embodiment of the present invention. Tuner (Radio tuner) 700 receives broadcast services that are transmitted, and converts those broadcast services into desired frequency signals. In FIG. 7, the Channel and FIZ Selector 720 controls the tuner 700 to down-convert a desired frequency ($f_o$). The output signals of the tuner, I and Q components, are fed into a Remodulator 710 in order to adjust the analog receive bandwidth. This output of the Remodulator 710 is filtered through a Low Pass Filter (LPF) 730. From the LPF 730 output, a desired FIZ signal is selected at a BW Selector 740 controlled by the Channel and FIZ selector 720. An ADC 750 translates the output of BW Selector 740, an analog output signal of a desired FIZ allocated at $f_{sh}$, into a digital signal. The digital signal is demodulated by a Next Generation Handheld (NGH) demodulator 760. Specifically, FIG. 7 shows an alternative receiver architecture that could be used to adjust the analog receive bandwidth to be appropriate to receive the preamble, and the whole first frame of a superframe, or to receive a frequency zone for the remainder of the frames of the superframe.

Figure 8:
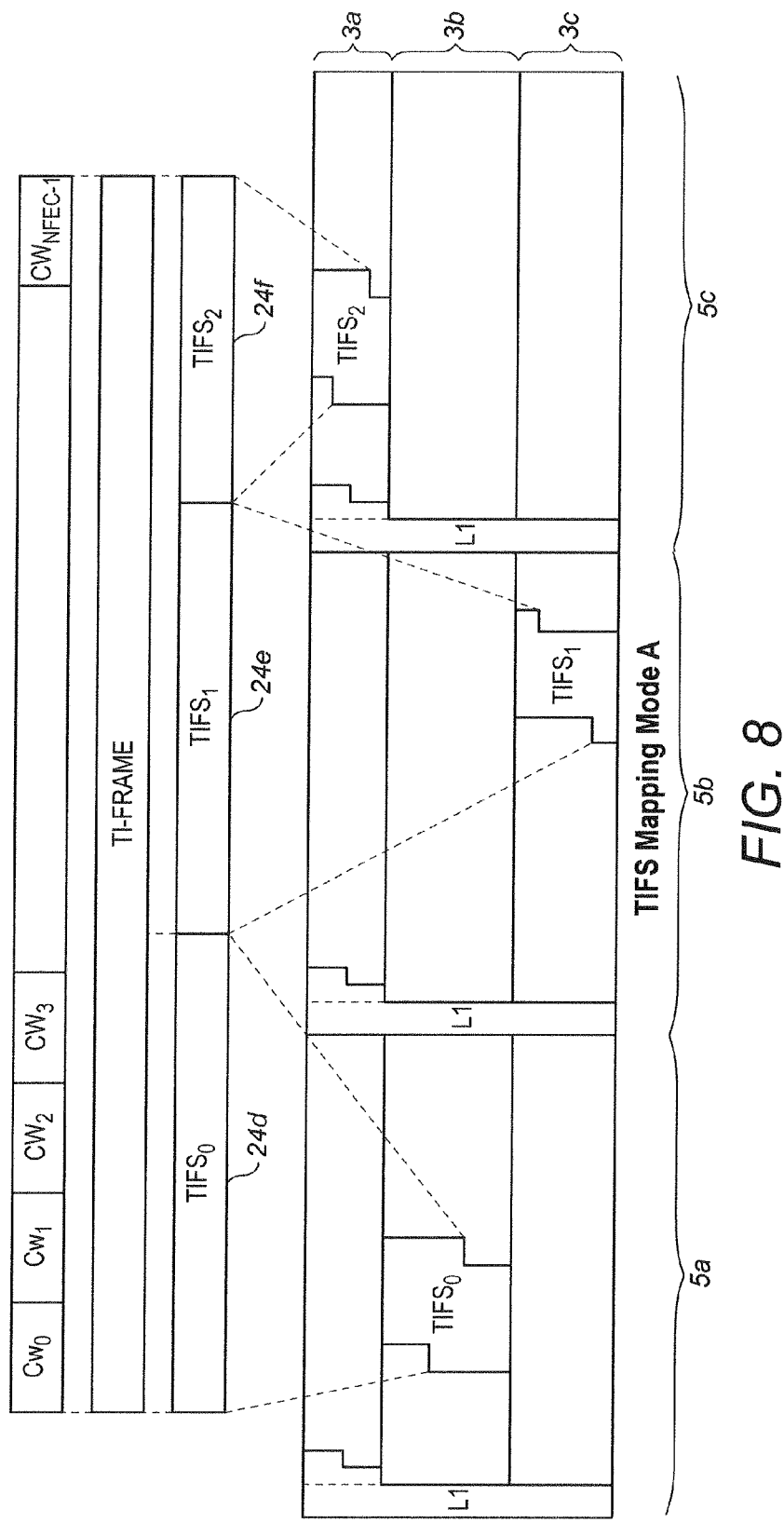
FIG. 8 is a diagram illustrating mapping of frequency interleaving zones to physical layer zones in Mode A, according to an embodiment of the present invention.

FIG. 8 is a diagram illustrating mapping of frequency interleaving zones to physical layer zones in TIFS Mapping Mode A, according to an embodiment of the present invention. A TI frame consists of a plurality of CodeWords (CWs) and is divided into three TIFSs 24d, 24e, 24f, mapped to different frequency zones 3a, 3b, 3c, of successive frames 5a, 5b, 5c.

Figure 9:
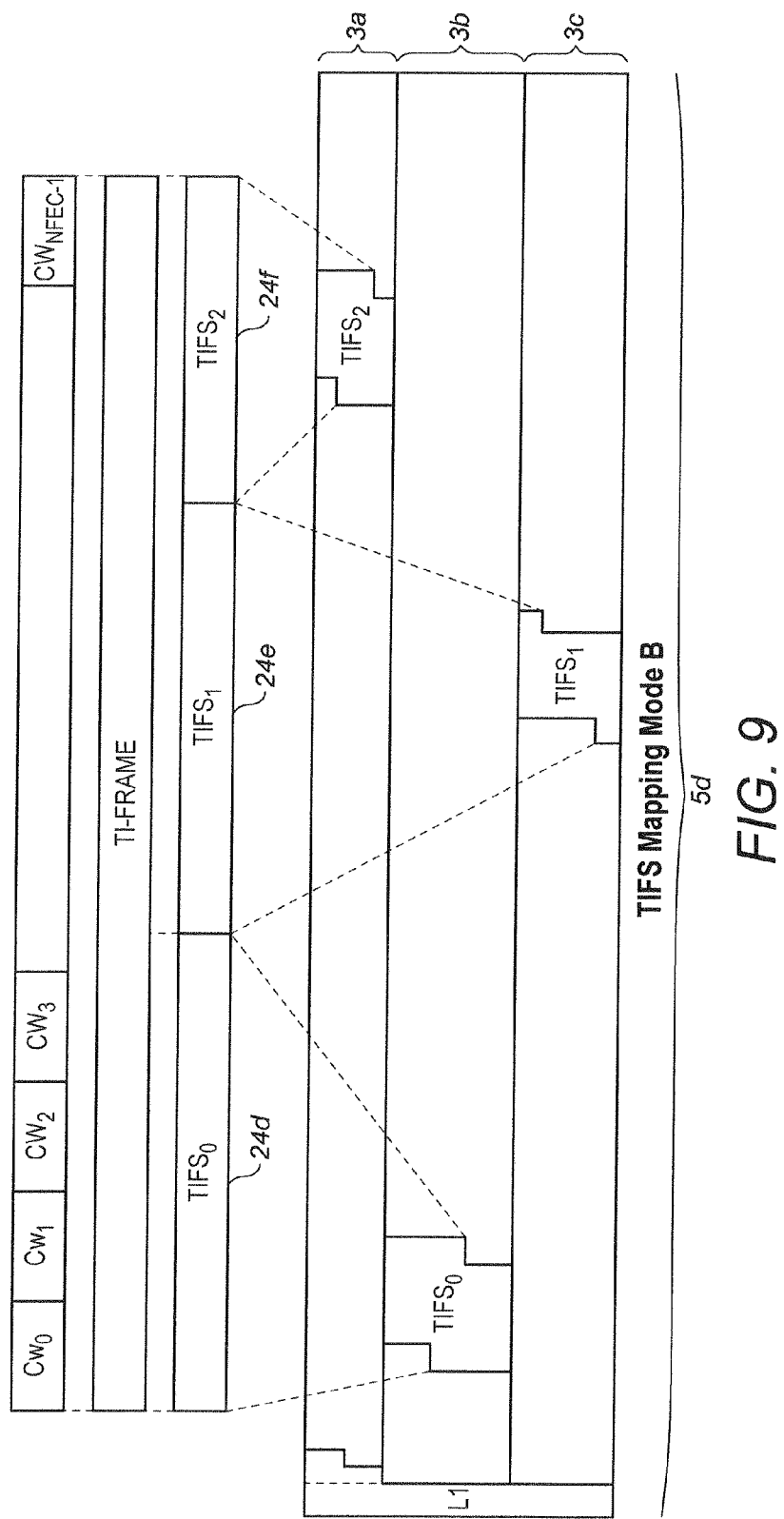
FIG. 9 is a diagram illustrating mapping of frequency interleaving zones to physical layer zones in Mode B, according to an embodiment of the present invention.

FIG. 9 is a diagram illustrating mapping of frequency interleaving zones to physical layer zones in TIFS Mapping Mode B, according to an embodiment of the present invention. A TI frame consists of a plurality of CWs and is divided into three TIFSs 24d, 24e, 24f, mapped to different frequency zones 3a, 3b, 3c, of a given frame 5d.

FIGS. 10 to 18 provide examples of signalling words that may be used in embodiments of the present invention.

FIG. 10 is a table showing the L1-config signaling field, according to an embodiment of the present invention. The total number of PLPs used during the super-frame is indicated by NUM_PLP. The limit, applicable to each of the frames in the super-frame, to the number of PLPs for which signalling information is carried in the first signalling information field is carried by NUM_PLP_IN_L1DYN, 30.

FIG. 11 is a table showing the L1-dyn signaling field, according to an embodiment of the present invention.

Referring to FIG. 11, reference numeral 32 relates to information regarding the PLPs for which information is carried within the L1 dynamic signaling field, rather than the L1 dynamic-EXT signaling field.

NUM_PLP_IN_L1DYN: The number of data streams signaled in the first signaling information in the current frame.

PLP_ID: An 8-bit field indicating the ID of the PLP carrying the data stream.

PLP_START: A 22-bit field indicating the start (location) of that PLP in the frame.

PLP_NUM_BLOCKS: A 10-bit field indicating the number of FEC blocks encapsulated in that PLP.

Reference numeral 34 relates to NUM_PLP_ext, which may indicate the number of PLPs for which signalling information is carried in the L1 dynamic_EXT signaling field, and NUM_IDLE_PLP, which refers to a number of idle physical layer pipes within the frame.

NUM_PLP_ext: An 8-bit field indicating the number of active PLPs in the second signaling part (in case the number of PLPs in the frame exceeds the limit).

NUM_IDLE_PLP: An 8-bit field indicates the number of idle PLPs in the current frame.

FIG. 12 is a table showing the L1 dynamic_EXT signaling field (referred to as the second signalling information field), according to an embodiment of the present invention.

Referring to FIG. 12, reference numeral 36 indicates components that carry signalling information relating to PLPs for which the information was not carried in the L1-dynamic signaling field, and signalling information relating to idle PLPs.

PLP_ID, PLP_START, PLP_NUM_BLOCKS: Same as in the signaling definition in FIG. 11, but for the PLPs in the extended part.

PLP_DELTA: An 8-bit field indicates the relative timing to when the idle PLP will become active again.

FIG. 13 is a table showing the L1-config (configuration) signalling field, according to an embodiment of the present invention. Specifically, FIG. 13 illustrates a further example of the "L1 config" information, which includes signalling relating to TIFSs. In FIG. 13, reference numerals 38, 40 and 42 are described in greater detail below.

NUM_FIZ: A 3-bit field indicating the number of FIZs.

NUM_TIFS_a: An 8-bit field indicating the number of TIFSs in the frame.

PLP_TIF_NUM_BLOCKS: A 10-bit field indicating the number of FEC blocks used in one time interleaving frame for a given PLP.

FIZ_LENGTH: A 10-bit field indicating the size of one FIZ in OFDM cells.

FIZ_MAPPING_TYPE: A 1-bit field indicating the mapping type of FIZ. This field is set to '1" if a TIFS Mapping Mode A is applied, and is set to "0" if a TIFS Mapping Mode B is applied.

FIG. 14 is a table showing the L1-dynamic signaling field, according to an embodiment of the present invention. Specifically, FIG. 14 illustrates a further example of an L1-dynamic signaling field (referred to as the first signalling information field) including signalling relating to TIFSs. In FIG. 14, reference numerals 44 and 46 are described in detail below.

PLP_ID: An 8-bit field indicating the ID of the PLP carrying the data stream.

PLP_TIFS_START: A 21-bit field indicating the start position in the given TIFS.

PLP_TIFS_LENGTH: A 15-bit field indicating the size of the PLP in the given TIFS.

PLP_TIFS_TYPE: A 2-bit field indicating the type of the PLP in the given TIFS (PLP Type 1 or Type 2).

PLP_TIFS_DRAME_IDX: A 1-bit field indicating the frame index of the PLP mapped onto the given TIFS.

PLP_TUFS_DELTA: A 4-bit field indicating the relative timing from the current TIFS to the next TIFS which will carry the given PLP (PLP ID).

FIZ_ID: A 1-bit field indicating the ID of the FIZ carrying the TIFS.

NUM_PLP_ext: An 8-bit field indicating the number of active PLPs in the second signaling part (in case the number of PLPs in the frame exceeds the limit).

NUM_IDLE_PLP: An 8-bit field indicating the number of idle PLPs in the current frame.

FIG. 15 is a table showing the L1-dynamic-Ext signaling field, according to an embodiment of the present invention. Specifically, FIG. 15 illustrates a further example of an L1-config-ext signaling field (referred to as the second signalling information field) including signalling relating to TIFSs. In FIG. 15, reference numeral 48 is similar to the signaling fields of FIG. 14.

FIG. 16 is a table showing IB signaling, according to an embodiment of the present invention. Specifically, FIG. 16 illustrates an example of an IB signaling word including signalling relating to TIFSs. Reference numeral 50 is similar to that provide with respect to FIG. 14.

FIG. 17 is a table showing the L1-pre signaling field, according to an embodiment of the present invention. Specifically, FIG. 17 illustrates an example of an L1-pre signaling field including signaling relating to physical layer zones. In FIG. 17, reference numeral 52 is described in detail below.

PZ0_PILOT_PATTERN: A 4-bit field indicating the pilot pattern in the Physical Zone 0 (First physical zone).

PZ0_GUARD_INTERVAL: A 3-bit field indicating the guard interval used in the Physical Zone 0 (first Physical Zone).

NUM_PZ: A 3-bit field indicating the number of the Physical Zones.

FIG. 18 is a table showing the L1-config signaling field, according to an embodiment of the present invention. Specifically, FIG. 18 illustrates a yet further example of an L1-config signaling field including signalling relating to physical layer zones. In FIG. 18, reference numerals 60, 54, 56 and 58 are described in detail below.

Reference numeral 54 is same as reference numeral 40

FIZ_LENGTH: A 10-bit field indicating the number of cells (capacity of the frequency interleaving zone).

FIZ_MAPPING_TYPE: A 1-bit field indicating either frequency-wise or time-wise mapping is used (mode A and B).

PZ_FFT_SIZE: A 4-bit field indicating the FFT size of the Physical Zone.

PZ_PILOT_PATTERN: A 1-bit field indicating the pilot pattern used in the given physical zone.

PZ_GUARD_INTERVAL: A 1-bit field indicating the OFDM guard interval used in the given physical zone.

Reference numeral 60 is same as reference numeral 38.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method of transmitting data comprising a data stream in a broadcast system, the method comprising the steps of:
segmenting the data stream into a plurality of segments of the data stream;
generating a frame,
wherein the frame comprises a preamble section and a data section,
wherein the data section carries the data stream, and the preamble section carries signaling information,
wherein generating the frame comprises:
segmenting the data section of the frame into a plurality of frequency zones; and
mapping at least one segment of the data stream to a frequency zone of the plurality of frequency zones, and
wherein the signaling information comprises first segmentation information, second segmentation information, and third segmentation information, the first segmentation information comprising start position information of each of the plurality of segments of the data stream, length information of each of the plurality of segments of the data stream, and an indication as to whether the third segmentation information is to be transmitted, the second segmentation information comprising number information of the plurality of frequency zones and size information of each of the plurality of frequency zones, and the third segmentation information comprising information related to another data stream; and
transmitting the frame to a receiver that efficiently receives the data stream and the another data stream based on the first segmentation information, the second segmentation information, and the third segmentation information.

2. The method of claim 1, wherein the preamble section is transmitted within a first frequency bandwidth and the at least one segment of the data stream is transmitted within a frequency zone having a second frequency bandwidth, and
wherein the first frequency bandwidth is greater than the second frequency bandwidth.

3. The method of claim 1, further comprising inserting pilot tones into the frame in a pattern that is independent of the data stream and data section segmentations.

4. The method of claim 1, further comprising mapping components carried within the frame to a same frequency zone,
wherein the data stream comprises components of a scalable video coding scheme.

5. The method of claim 1, wherein the preamble section comprises L1-config, L1-dynamic, and L1-dynamic EXT sections, and
wherein the L1-config section has signaling information that is substantially identical for each frame of a super-frame, the L1-dynamic section has signaling information for reception of a first number of data streams, and the L1-dynamic EXT section has signaling information for reception of further data streams after the first number of data streams.

6. The method of claim 5, wherein the signaling information in the L1-dynamic and the L1-dynamic EXT sections has start position information and length information of each segment of the data stream.

7. A method of receiving data comprising a data stream in a broadcast system, the method comprising the steps of:
receiving a frame, wherein the frame comprises a preamble section and a data section, the data section carries the data stream, and the preamble section carries signaling information, and the data section is segmented into a plurality of frequency zones, wherein the data stream is segmented into a plurality of segments of the data stream, and a segment of the data stream is mapped to a frequency zone of the plurality of frequency zones, and wherein the signaling information comprises first segmentation information, second segmentation information, and third segmentation information, the first segmentation information comprising start position information of each of the plurality of segments of the data stream, length information of each of the plurality of segments of the data stream, and an indication as to whether the third segmentation information is to be transmitted, the second segmentation information comprising number information of the plurality of frequency zones and size information of each of the plurality of frequency zones, and the third segmentation information comprising information related to another data stream; and demodulating the frame in order to efficiently receive the data stream and the another data stream based on the first segmentation information, the second segmentation information, and the third segmentation information.

8. The method of claim 7, wherein the preamble section is received within a first frequency bandwidth and the segment of the data stream is received within a frequency zone having a second frequency bandwidth, and wherein the first frequency bandwidth is greater than the second frequency bandwidth.

9. The method of claim 7, wherein the frame has pilot tones in a pattern that is independent of the data stream and data section segmentations.

10. The method of claim 7, further comprising mapping components carried within the frame to a same frequency zone, wherein the data stream comprises components of a scalable video coding scheme.

11. The method of claim 7, wherein the preamble section comprises L1-config, L1-dynamic, and L1-dynamic EXT sections, and wherein the L1-config section has signaling information that is substantially identical for each frame of a super-frame, the L1-dynamic section has signaling information for reception of a first number of data streams, and the L1-dynamic EXT section has signaling information for reception of further data streams after the first number of data streams.

12. The method of claim 11, wherein the signaling information in the L1-dynamic and L1-dynamic EXT sections has start position information and length information of each segment of the data stream.

13. A transmitter for transmitting data comprising a data stream in a broadcast system, the transmitter comprising:

a segmenting and mapping unit configured to segment the data stream into a plurality of segments of the data stream and to map at least one segment of the data stream onto a segmented frequency zone of a plurality of frequency zones;

a signaling generation block configured to deliver signaling information;

an Orthogonal Frequency Division Multiplexing (OFDM) generation unit configured to map the plurality of segments of the data stream and the signalling information onto OFDM resources in a frame, wherein the signaling information comprises first segmentation information, second segmentation information, and third segmentation information, the first segmentation information comprising start position information of each of the plurality of segments of the data stream, length information of each of the plurality of segments of the data stream, and an indication as to whether the third segmentation information is to be transmitted, the second segmentation information comprising number information of the plurality of frequency zones and size information of each of the plurality of frequency zones, and the third segmentation information comprising information related to another data stream; and a transceiver configured to transmit the frame to a receiver that efficiently receives the data stream and the another data stream based on the first segmentation information, the second segmentation information, and the third segmentation information.

14. The transmitter of claim 13, wherein the signaling information is transmitted within a first frequency bandwidth and a segment of the data stream is transmitted within a frequency zone having a second frequency bandwidth, and wherein the first frequency bandwidth is greater than the second frequency bandwidth.

15. The transmitter of claim 13, wherein the signaling information comprises L1-config, L1-dynamic, and L1-dynamic EXT sections, and wherein the L1-config section has signaling information that is substantially identical for each frame of a super-frame, the L1-dynamic section has signaling information for reception of a first number of data streams, and the L1-dynamic EXT section has signaling information for reception of further data streams after the first number of data streams.

16. The transmitter of claim 15, wherein the signaling information in the L1-dynamic and L1-dynamic EXT sections has start position information and length information of each segment of the data stream.

17. A receiver for receiving data comprising a data stream in a broadcast system, the receiver comprising:

a signal processing unit configured to process a received signal for demodulation, the received signal comprising at least one frame, wherein the frame comprises a preamble section and a data section, the data section carries the data stream, the preamble section carries signaling information, and the data section is segmented into a plurality of frequency zones;

a controller configured to control the signal processing unit to process the signaling information and a segment of the data stream, wherein the segment of the data stream is received via a segmented frequency zone of the plurality of frequency zones, and wherein the signaling information comprises first segmentation information, second segmentation information, and third segmentation information, the first segmentation information comprising start position information of each of the plurality of segments of the data stream, length information of each of the plurality of segments of the data stream, and an indication as to whether the third segmentation information is to be transmitted, the second segmentation information comprising number information of the plurality of frequency zones and size information of each of the plurality of frequency zones, and the third segmentation information comprising information related to another data stream; and a demodulator configured to demodulate the segmented data stream and the signaling information in order to efficiently receive the data stream and the another data stream based on the first segmentation information, the second segmentation information, and the third segmentation information.

18. The receiver of claim 17, wherein the signaling information is transmitted within a first frequency bandwidth and the segment of the data stream is transmitted within the segmented frequency zone having a second frequency bandwidth, and wherein the first frequency bandwidth is greater than the second frequency bandwidth.

19. The receiver of claim 17, wherein the signaling information comprises L1-config, L1-dynamic, and L1-dynamic EXT sections, and wherein the L1-config section has signaling information that is substantially identical for each frame of a super-frame, the L1-dynamic section has signaling information for reception of a first number of data streams, and the L1-dynamic EXT section has signaling information for reception of further data streams after the first number of data streams.

20. The receiver of claim 19, wherein the signaling information in the L1-dynamic and L1-dynamic EXT sections has start position information and length information of each segment of the data stream.

21. The method of claim 1, wherein the signaling information is transmitted within a wider frequency band than each of the frequency zones.

22. The method of claim 7, wherein the signaling information is transmitted within a wider frequency band than each of the frequency zones.

23. The transmitter of claim 13, wherein the signaling information is transmitted within a wider frequency band than each of the frequency zones.

24. The receiver of claim 17, wherein the signaling information is transmitted within a wider frequency band than each of the frequency zones.

\* \* \* \* \*